UNITED STATES PATENT OFFICE 2,610,106

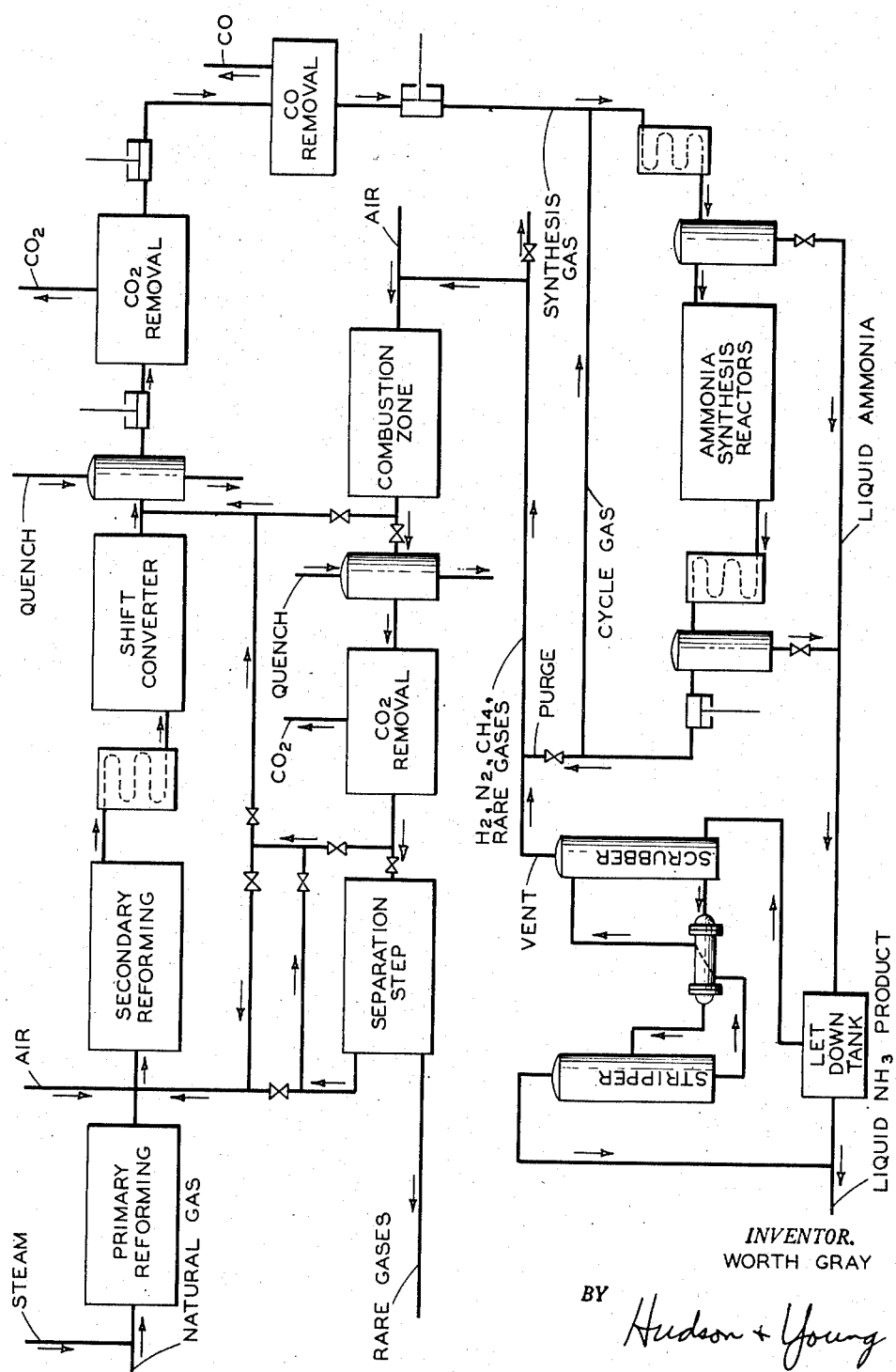

PRODUCTION OF AMMONIA

Worth Gray, Dumas, Tex., assignor to Phillips Petroleum Company, a corporation of Delaware Application January 4, 1950, Serial No. 136,787

3 Claims. (Cl. 23—199)

This invention relates to the production of ammonia by its synthesis from hydrogen and nitrogen. In some of its more specific aspects the invention relates to such a process in which a hydrogen-nitrogen synthesis gas is obtained by first reforming a hydrocarbon gas such as natural gas by reaction with steam to form hydrogen and carbon monoxide and then reacting this material with air to remove residual hydrocarbons and remove the oxygen from the air by reaction with such hydrocarbons and hydrogen thereby providing nitrogen from the air for the ammonia synthesis. In preferred embodiments the invention pertains to the treatment of purge and/or vent gases from the ammonia synthesis system which are normally wasted in order to recover and/or utilize valuable components thereof.

In the synthesis of ammonia by reaction of hydrogen with nitrogen, a synthesis gas containing hydrogen and nitrogen in the approximate ratio of 3:1 is obtained from any suitable source, preferably that described hereinbelow. This gas is compressed to a high pressure, for example 5000 p. s. i. g., and after admixture with cycle gases containing unreacted hydrogen and nitrogen from the process the mixed gas is passed in contact with a suitable metallic catalyst, such as iron, at known conditions, for example 450–550° C. The effluent gases are cooled to condense out ammonia product as a liquid. The remaining unreacted gas, also containing gases introduced to the system in the synthesis gas which are inert in the reaction, for example methane, helium, argon, and other rare gases, is compressed and returned as cycle gas to admixture with the fresh synthesis gas. Often this admixed gas is first subjected to cooling and separation of condensed ammonia prior to its introduction to the synthesis reactors, thus minimizing the ammonia content of the gases introduced to the reaction. The liquid ammonia collected at one or both points as described is passed into what is known as a let down tank wherein the pressure is decreased to a value not greatly in excess of atmospheric. Gases are recovered from this let down tank, scrubbed with water to recover ammonia therefrom, and ordinarily vented to the atmosphere, although these gases are composed largely of hydrogen and nitrogen. In order to avoid a build up in the cycle gas of gases inert to the reaction, i. e. methane and rare gases, to such an extent that their partial pressure effect becomes deleterious in the reaction, a portion of the cycle gas is intermittently or continuously purged from the system. This cycle gas likewise is composed largely of hydrogen and nitrogen, but also contains the aforesaid inert gases in total amounts which may range in the neighborhood of 20 per cent.

Synthesis gas is most commonly and preferably obtained as follows. A hydrocarbon gas, ordinarily a methane-rich gas such as natural gas, is reacted with a large quantity of excess steam in contact with a reforming catalyst such as reduced nickel oxide at a temperature which may be in the range of 700 to 750° C. to convert most of the hydrocarbon to hydrogen, carbon monoxide, and some carbon dioxide. This is accomplished in what is known as a primary reforming step. Air is then introduced to the hot gases in a quantity sufficient to supply the nitrogen required in the ammonia synthesis and the resulting mixture passed through what is known as a secondary reforming step wherein the oxygen of the air reacts with hydrogen and with a portion of the residual methane content of the primary reformed gas, preferably in the presence of a catalyst, for example the same type of catalyst as used in the primary reforming zone. Because of the large amount of hydrogen present in the secondary reforming step, further reduction of the methane content of the gas by direct combustion with the oxygen of the air is difficult. The gases are next cooled somewhat and passed through a shift converter in contact with a suitable catalyst such as iron oxide wherein the water gas shift reaction occurs between water and carbon monoxide forming hydrogen and carbon dioxide. The gases are next quenched, compressed somewhat, and then passed into contact with a suitable medium for removing carbon dioxide, preferably a 10 to 25% aqueous solution of monoethanolamine. After further compression the small amount of residual carbon monoxide is removed by any suitable means, for example by contacting the gases with a cuprous solution. The resulting material is composed essentially of 3 parts of hydrogen to 1 part of nitrogen, together with undesired but necessarily present small amounts of residual methane and any helium, argon, and other inert gases present in the starting gases. This fresh synthesis gas is given the final compression to the ammonia synthesis reaction pressure as described hereinabove.

It is an object of this invention to provide an improved process for the synthesis of ammonia. Another object of the invention is to reduce the loss of valuable components in cycle gas purged from the ammonia synthesis system. A further object of the invention is to improve the efficiency of the synthesis gas producing step when such synthesis gas is produced by the reforming of natural gas followed by a secondary reaction thereof with air. A further object is to recover nitrogen from purge and vent gases in an ammonia synthesis process for ultimate re-use in the process. Another object of the invention is to utilize hydrogen present in purge and vent gases in an ammonia synthesis system which are ordinarily wasted. A still further object is to improve the efficiency of methane removal in a combined natural gas reforming-ammonia synthesis process. Other objects and advantages of the invention will be apparent, to one skilled in the art, from the accompanying disclosure and discussion.

In accordance with a preferred embodiment of my invention the purged cycle gas and/or the vent gas from the ammonia let down system is admixed with the quantity of air stoichiometrically required to convert all of the hydrogen and methane present therein to water and carbon dioxide. The mixture is subject to combustion conditions, either at fairly high temperatures in the absence of a catalyst or at somewhat lower temperatures in the presence of a catalyst. By this means the methane content of the gases in question, which normally runs as high as 10% or even higher, is readily destroyed. Furthermore, all of this methane, together with all of the hydrogen present in the gases being treated, are effectively utilized in removing oxygen from the introduced air thereby supplying the maximum possible quantity of oxygen-free nitrogen in the gases resulting from the combustion. Inasmuch as there is no objection in this step to the complete combustion of hydrogen, it is quite simple to burn simultaneously all of the methane. Furthermore, all of the nitrogen present in the vent and/or purge gases thus treated is now present in a usable form uncontaminated with methane and also admixed with the nitrogen introduced from the air. The mixture of gases resulting from my treatment of purge and/or vent gases, in addition to water, is composed solely of nitrogen plus any rare gases present in said purge and vent gases. This mixture of gases is now introduced into the synthesis gas preparation part of the process at one of several suitable points, but in any event in a low pressure stage thereof. I prefer to introduce the gas mixture to the process immediately after the shift converter, whereby the treated gases, still hot from the combustion, are first quenched then partially compressed and passed to $CO_2$ removal. The gas, admixed with the fresh synthesis gas being made, passed on through further compression, CO removal, and final compression to ultimate re-use in the ammonia synthesis reaction. As an alternative, my hot gases resulting from the controlled combustion of purge and/or vent gas with controlled quantity of air are first quenched and passed through a separate $CO_2$ removal step wherein they are scrubbed with a monoethanolamine solution or otherwise treated for removal of $CO_2$, therefrom. The resulting gas composed entirely of nitrogen plus small amounts of rare gases is then introduced into the synthesis gas preparation portion of the process, either to admixture with the feed to the secondary reformer, or immediately after the shift converter.

Inasmuch as my process as described up to this point makes no provision for the removal of rare gases, although it does provide a highly satisfactory removal of methane, a limited quantity of the cycle gas and/or vent gas must still be purged to the atmosphere in order to avoid a pyramiding of these rare gases in the system. However, if economically justified, even this purge can be avoided by subjecting my combustion gases, after removal of $CO_2$ therefrom, to treatment for segregation of the nitrogen content thereof from the rare gas content thereof. This may take the form of adsorption of the nitrogen on activated charcoal or other solid adsorbent with the rare gases passing through unadsorbed and being recovered for any desired use or discarded, followed by desorption of the nitrogen. Alternatively and often more economically, depending largely on the volumes of gases to be treated, low temperature fractional distillation may be employed in known manner to separate the gas into nitrogen, helium, and argon-rich streams, or one rare gas stream plus a nitrogen stream. In any event when one of these separations processes is used, the resulting pure nitrogen is introduced to the process as described hereinabove.

From the foregoing it will be appreciated that numerous advantages are present in my process. One of the most important of these is that in the synthesis gas preparation steps normally employed a considerable amount of valuable hydrogen is actually wasted in the secondary reforming step merely to remove oxygen from the air introduced at that point in order to provide sufficient nitrogen for the ammonia synthesis. It will also be appreciated that the residual methane left in the gas leaving the primary reformer and which if not removed will ultimately appear in the cycle gas in the ammonia synthesis system, is present in proportions of only about 1% or in any event preferably not greater than 2.5% of the primary reformed gas on the dry basis. The concentration of methane in the secondary reformer is even less than these values due to the large amount of air introduced thereto with its resultant diluting effect as well as the large quantity of steam present. Under such conditions further removal of methane is difficult and is largely dependent on a slight additional amount of reforming reaction with steam present, rather than direct removal by combustion with oxygen from the air. By my process I employ the hydrogen content of the gases normally purged to the atmosphere, to react with oxygen from air introduced into admixture with purge and vent gases. Correspondingly the equivalent amount of hydrogen normally consumed in the secondary reformer is saved, since the air introduced to the secondary reformer can be decreased by an amount equal to the air introduced to my combustion zone wherein I react air with purge and vent gases. Thus hydrogen of low economic value and normally wasted acts to save the same amount of high-value hydrogen normally consumed in the secondary reformer. Additionally, a more complete and adequate removal of methane from the system is obtained, since in its high concentration of 10 or more per cent in the purge and vent gases it is easily removed by oxidation with air, particularly since I desire to and actually do remove all the hydrogen in these gases by combustion allowing a complete combustion also of the methane therein.

As an indication of the type of gases treated by my process, typical purge and vent gases will contain, on an ammonia-free basis, in the neighborhood of 60% hydrogen, 20% nitrogen and 20% inerts as an ordinarily allowable maximum (by inerts I mean methane plus rare gases, i. e. all gases inert in the ammonia synthesis). Analyses made from time to time frequently fall within the ranges: hydrogen 50–65%, nitrogen 17–25%, inerts 10–30%, with the methane content of the inerts varying depending upon the amount of rare gases present. The hydrogen:nitrogen ratio of the gases passed into contact with the ammonia synthesis catalyst is preferably maintained at 3:1, although operations are generally satisfactory within the ranges of 2.5:1 to 3.5:1. As an indication of the quantity of gases treated, the total purge and vent gases under one typical set of conditions totaled 5,700 cubic feet per ton of ammonia produced. One ton of ammonia represents 25,000 cubic feet of natural gas introduced to the primary reforming step of the process. Relative proportions of purge and vent gases will vary considerably depending upon pressure and temperature conditions, but often their volumes will be approximately equal. In the present specification and claims the words "purge gas" unless otherwise limited refer to a portion of cycle gas withdrawn and not returned directly to the ammonia synthesis reaction. The words "vent gas" unless otherwise limited refer to gas withdrawn from low pressure liquid ammonia storage and containing hydrogen and nitrogen, and ordinarily scrubbed free of ammonia. The words "cycle gas" refer to gas obtained from the effluents of ammonia synthesis reactors which contain unreacted hydrogen and nitrogen and which is recycled directly to the synthesis reaction. If the ammonia content of the cycle gas is sufficiently high to warrant such treatment, the purge gas which I subject to combustion with air may be treated to recover the ammonia therefrom prior to such combustion.

The accompanying drawing is a diagrammatic representation of one preferred embodiment of my invention as described herein, some of the various alternatives mentioned hereinabove being shown in the drawing. The valves in the drawing either indicate alternative flows, which can readily be followed in conjunction with the detailed description given hereinabove, or represent points at which the high pressure maintained in the ammonia synthesis system is decreased to much lower or even atmospheric pressure. These remarks taken with the legends on the drawing make the drawing fully self-explanatory.

While the invention has been described in detail with particular reference to preferred modifications thereof, variations in operation can be made by one skilled in the art, having been given the present disclosure, without departing from the spirit and scope of the invention as defined in the claims.

I claim:

1. In a process wherein natural gas is reformed by reaction with steam to produce a gas containing hydrogen and carbon monoxide and residual quantities of methane, air is admixed with said gas and subjected to a second reaction causing removal of oxygen present in said air by combustion reaction, resulting gas is freed of carbon monoxide and carbon dioxide, thus purified gas rich in hydrogen and nitrogen but still containing a modicum of methane is compressed and contacted with an ammonia synthesis catalyst at synthesis conditions causing formation of ammonia by reaction of hydrogen with nitrogen, ammonia is recovered as product, cycle gas containing unreacted hydrogen and nitrogen and having methane concentrated therein by virtue of its inertness in the ammonia synthesis reaction is recycled to the ammonia synthesis reaction, and a portion of said cycle gas is withdrawn from the ammonia synthesis system to avoid pyramiding of methane therein, the improvement whereby hydrogen and nitrogen in said withdrawn gas are utilized reducing the amount of air necessary to be added to said second reaction and methane therein is effectively removed from the process, which comprises admixing air with said withdrawn portion of gas, subjecting the resulting admixture to combustion conditions causing reaction of oxygen in said air with methane and hydrogen in said gas to produce a resulting methane-poor, hydrogen-poor, nitrogen-rich gas, and introducing same into admixture with gas obtained from said second reaction whereby the nitrogen content of the gas resulting from the last said combustion is reintroduced to the ammonia synthesis reaction.

2. A process according to claim 1 wherein liquid ammonia is condensed at the pressure of the ammonia synthesis, the pressure on said liquid ammonia is released with resultant liberation of a vent gas containing hydrogen and nitrogen, ammonia is recovered from said vent gas, and said vent gas is admixed with the said withdrawn portion of gas for subsequent treatment with air as described.

3. In a process wherein natural gas is reformed by reaction with steam to produce a gas containing hydrogen and carbon monoxide and residual quantities of methane, air is admixed with said gas and subjected to a second reaction causing removal of oxygen present in said air by combustion reaction, resulting gas is subjected to the water-gas shift reaction to convert carbon monoxide and water to carbon dioxide and hydrogen, the shifted gas is quenched, compressed, and treated to remove carbon dioxide and carbon monoxide therefrom, thus purified gas rich in hydrogen and nitrogen but still containing a modicum of methane is compressed and contacted with an ammonia synthesis catalyst at synthesis conditions causing formation of ammonia by reaction of hydrogen with nitrogen, ammonia is recovered as product, cycle gas containing unreacted hydrogen and nitrogen and having methane concentrated therein by virtue of its inertness in the ammonia synthesis reaction is recycled to the ammonia synthesis reaction, and a portion of said cycle gas is withdrawn from the ammonia synthesis system to avoid pyramiding of methane therein, the improvement whereby hydrogen and nitrogen in said withdrawn gas are utilized reducing the amount of air necessary to be added to said second reaction and methane therein is effectively removed from the process, which comprises admixing air with said withdrawn portion of gas, subjecting the resulting admixture to combustion conditions causing reaction of oxygen in said air with methane and hydrogen in said gas to produce a resulting methane-poor, hydrogen-poor, nitrogen-rich hot gas, and introducing same into admixture with said shifted gas whereby the nitrogen content of the gas resulting from the last said combustion is reintroduced to the ammonia synthesis reaction.

WORTH GRAY.

REFERENCES CITED

The following references are of record in the file of this patent:

UNITED STATES PATENTS

| Number | Name | Date |
|---|---|---|
| 1,875,926 | Hughes | Sept. 6, 1932 |
| 1,931,442 | Klempt | Oct. 17, 1933 |
| 2,135,694 | Bardwell et al. | Nov. 8, 1938 |
| 2,166,611 | Schapleigh | July 18, 1939 |